United States Patent [19]

Krome

[11] 3,920,761

[45] Nov. 18, 1975

[54] PRODUCTION OF VINYL CHLORIDE

[75] Inventor: Gerd Krome, Ludwigshafen, Germany

[73] Assignee: BASF Aktiengesellschaft, Ludwigshafen (Rhine), Germany

[22] Filed: Feb. 1, 1974

[21] Appl. No.: 438,754

[30] Foreign Application Priority Data

Feb. 15, 1973 Germany..........................2307376

[52] U.S. Cl................................................ 260/656 R
[51] Int. Cl.² ................................................ C07C 21/06
[58] Field of Search ...................................... 260/656

[56] References Cited
UNITED STATES PATENTS 3,125,607  3/1964  Keating et al.................. 260/656 R

FOREIGN PATENTS OR APPLICATIONS

| | | | |
|---|---|---|---|
| 2,063,188 | 7/1971 | Germany.......................... | 260/656 R |
| 1,959,211 | 6/1970 | Germany.......................... | 260/656 R |
| 1,288,594 | 2/1969 | Germany.......................... | 260/656 R |

*Primary Examiner*—D. Horwitz
*Attorney, Agent, or Firm*—Johnston, Keil, Thompson & Shurtleff

[57] ABSTRACT

A process for the production of vinyl chloride by cleavage of dichloroethane. Troublesome byproducts are reacted with chlorine and removed. The very pure vinyl chloride obtained may be used for the manufacture of polyvinyl chloride.

6 Claims, 1 Drawing Figure

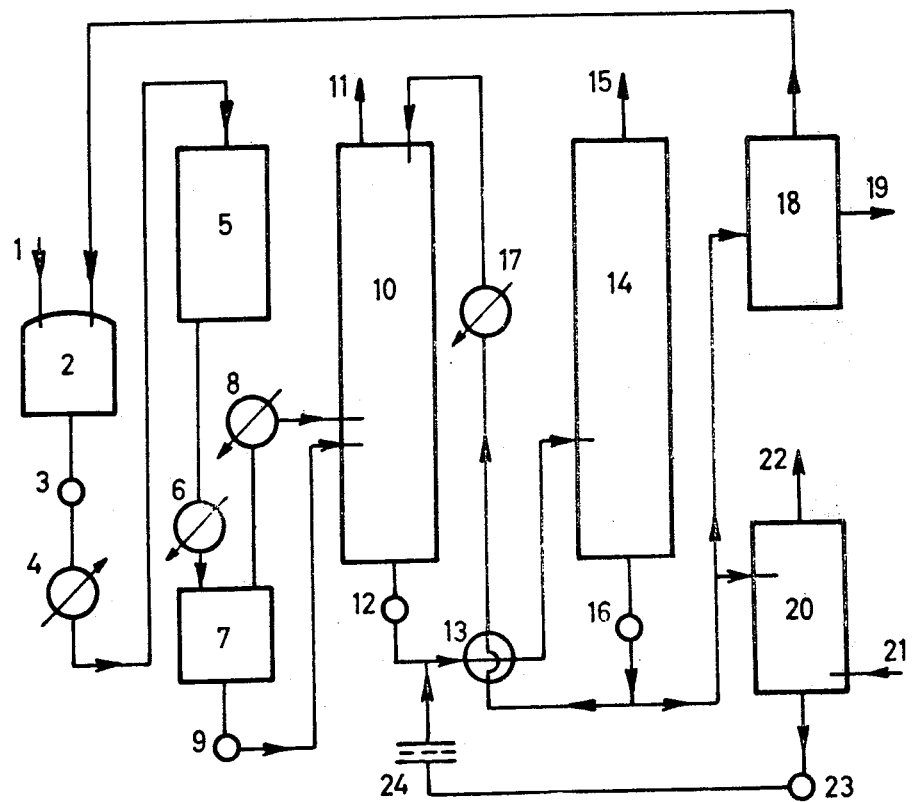

PRODUCTION OF VINYL CHLORIDE

The invention relates to a process for the production of vinyl chloride by cleavage of dichloroethane, in which troublesome byproducts are reacted with chlorine and removed.

Vinyl chloride is manufactured on an industrial scale by cleavage of dichloroethane. This process is described for example in Ullmann's Enzyklopaedie der technischen Chemie, vol. 18, pages 91 to 93, which states that vinyl chloride obtained in this way contains 1,3-butadiene as a troublesome impurity and that the content of chloroprene in the dichloroethane used has to be kept as low as possible.

The invention therefore has for an object the removal by a simple method of the 1,3-butadiene formed in an amount of from about 5 to 200 ppm in the manufacture of vinyl chloride. The content of chloroprene in the reaction mixture from the cleavage of dichloroethane is also kept at a minimum by the invention.

These objects are achieved in accordance with the invention by adding to the reaction mixture after the cleavage of dichloroethane from 0.01 to 1% by weight of chlorine (based on the dichloroethane originally used) prior to the separation of the vinyl chloride.

The starting material for the process is dichloroethane which is generally prepared by chlorination or oxychlorination of ethylene followed by purification. At temperatures of from about 500° to 550°C dichloroethane is dissociated thermally into vinyl chloride and hydrogen chloride to the extent of from 50 to 70%. The degree of cleavage can be increased to more than 90% by adding suitable catalysts. The gas mixture is cooled and tarry and solid byproducts can then be removed. The reaction mixture, which may already be partly liquefied, is then introduced into a column in which hydrogen chloride is removed and it may be washed with cold dichloroethane. A mixture of vinyl chloride and dichloroethane is drawn off at the bottom of the column. Vinyl chloride is separated from this mixture by fractional distillation; it may be further purified by stripping. Dichloroethane together with small amounts of chloroprene and contaminants of higher boiling point is obtained as a liquid product. The content of chloroprene increases with the degree of cleavage. Since chloroprene readily polymerizes, deposits may form in the lower portion of the distillation column and give rise to operational disturbances. These are prevented by the process according to the invention. Unreacted dichloroethane has to be freed from impurities in a further purification column before it is returned to the cleavage operation.

The process according to the invention consists in adding chlorine to the reaction mixture at any point after the cleavage of the dichloroethane but prior to the separation of the vinyl chloride, the amount of chlorine added being from 0.01 to 1% by weight based on the amount of dichloroethane originally used.

Chlorine reacts with the unsaturated compounds contained in the reaction mixture and it has been found that surprisingly it reacts at the slowest rate with vinyl chloride itself so that vinyl chloride is not attacked until the major proportion of the impurities has been chlorinated. The most injurious 1,3-butadiene is chlorinated almost quantitatively, monovinylacetylene reacts to the extent of about half and chloroprene to almost two-thirds before there is any appreciable attack on vinyl chloride. Since chloroprene usually far outweights the other impurities it is convenient to determine the amount of chlorine used approximately according to the amount of chloroprene present in the reaction mixture. From about 0.1 to 0.6% of chlorine (based on the weight of the dichloroethane originally used) is generally sufficient at a degree of cleavage of from 70 to 90%.

The chlorine introduced is used up quantitatively in the reaction. The reaction temperature may lie at from −30°C to +150°C depending on where the chlorine is supplied.

It is convenient to dissolve the chlorine in dichloroethane, for example by branching off a small portion of the unreacted dichloroethane separated from vinyl chloride, for example from 10 to 30% by weight, and adding the calculated amount of chlorine to it. The unsaturated compounds contained in the dichloroethane are thus already partly reacted; chloroprene is reacted quantitatively. This mixture may then be compressed and fed into the reaction mixture at a suitable point. It is preferred to feed it into the discharge from the distillation column in which hydrogen chloride is removed. Temperatures of from 20° to 100°C generally prevail at this point. The chlorine may also be fed in at other points, for example into the supply to the hydrogen chloride column.

A preferred embodiment of the process according to the invention is illustrated diagrammatically in the drawing.

Dichloroethane 1 which has been prepared by chlorination or oxychlorination of ethylene and then purified is collected in a reservoir 2. Thence it is passed through a pump 3 and evaporator 4 into a tubular cleavage vessel 5. Cleavage into vinyl chloride and hydrogen chloride takes place therein. The reaction mixture is cooled in a water cooler 6 and partly condensed in a receiver 7. The gas phase passes by way of a brine cooler 8 into a scrubbing column 10 and the liquid phase is passed through a pump 9 immediately into the column 10. Vinyl chloride is washed out from the hydrogen chloride 11 therein with dichloroethane. The mixture of dichloroethane and vinyl chloride is passed through pump 12 into a heat exchanger 13, heated therein and then passed into a distillation column 14. Gaseous vinyl chloride is separated in this column; it is purified by stripping and may be used other purposes. Crude dichloroethane is withdrawn at the bottom of the column through pump 16. Some of it is cooled first in the heat exchanger 13 and then in a brine cooler 17 and introduced as washing liquid into the scrubbing column 10. The bulk of the remainder is freed from impurities 19 in a purification column 18 and returned to the reservoir 2. A small amount of the dichloroethane is passed into a container 20 where it is loaded with gaseous chlorine 21. The off-gas 22 consists mainly of hydrogen chloride which is saturated with dichloroethane. The dichloroethane containing chlorine is fed through a pump 23 and a perforated disc 24 into the discharge from column 10 where the chlorination reaction according to the invention may then take place.

The invention is illustrated by the Example in which parts and percentages are by weight.

EXAMPLE 10 metric tons of dichloroethane per hour is supplied to the cleavage vessel 2 at a temperature of 530°C and a pressure of 4 bar. The degree of cleavage occurring is 76%. The gas mixture is cooled to 50°C. The scrubbing column 10 has dichloroethane flowing through it as washing liquid which has been cooled to a temperature of −25°C. The column 10 is operated so that the mixture of dichloroethane and vinyl chloride withdrawn contains only about 1000 ppm of hydrogen chloride. This mixture is compressed to 7 bar and then reaction with the chlorine supplied may take place at a temperature of about 50°C. The distillation column 14 has 30 trays with a reflux of 0.5 part by weight per part by weight of vinyl chloride withdrawn. It is operated so that the crude dichloroethane contains less than 0.5% of vinyl chloride. Some of this dichloroethane is passed into a scrubbing column 10 and the remainder is used for purification 18. About 1 metric ton per hour is branched off from this stream and loaded with about 2% of chlorine in container 20.

The vinyl chloride 15 obtained in column 14 has the following composition:

| vinyl chloride | more than 99.9% |
| --- | --- |
| butadiene | 0.5 ppm |
| monovinylacetylene | 18 ppm |
| hydrogen chloride | 57 ppm |
| water | 19 ppm |
| methyl chloride | 56 ppm |
| ethyl chloride | 13 ppm |

Prior to purification 17 the crude dichloroethane contains the following impurities:

| chloroprene | 0.18% |
| --- | --- |
| 1,1,2-trichloroethane | 0.35% |

In a comparative example without adding chlorine the products contained the following impurities:

| vinyl chloride: | |
| --- | --- |
| butadiene | 72 ppm |
| monovinylacetylene | 42 ppm |
| otherwise the same | |
| dichloroethane: | |
| chloroprene | 0.47% |
| 1,1,2-trichloroethane | 0.21% |

I claim:

1. In a process for the production of vinyl chloride by the cleavage of dichloroethane to form a reaction mixture containing vinyl chloride, hydrogen chloride, unreacted dichloroethane and the impurities 1,3 butadiene and chloroprene, the improvement which comprises: adding from 0.01 to 1% of chlorine to said reaction mixture based on the weight of the dichloroethane used in the process after the cleavage of dichloroethane but before separating vinyl chloride from said mixture, whereby said chlorine reacts with said 1,3 butadiene and chloroprene, and thereafter separating said vinyl chloride from said unreacted dichloroethane, said vinyl chloride remaining substantially unreacted with said chlorine.

2. A process for the production of vinyl chloride as set forth in claim 1 wherein the chlorine is dissolved in some of the unreacted dichloroethane after separation from the vinyl chloride, and the resulting mixture is added to the reaction mixture after the removal of hydrogen chloride.

3. A process for the production of vinyl chloride as set forth in claim 1 wherein the chlorine is added to the reaction mixture prior to the removal of hydrogen chloride.

4. A process for the production of vinyl chloride as set forth in claim 1 wherein the chlorine is added in an amount of from 0.1 to 0.6% by weight.

5. A process for the production of vinyl chloride as set forth in claim 1 wherein the chlorine is reacted with the impurities: butadiene, chloroprene and monovinylacetylene contained in the vinyl chloride.

6. A process for the production of vinyl chloride as set forth in claim 1 wherein the reaction with chlorine is carried out at a temperature of from −30° to +150°C.

* * * * *